(12) United States Patent
Zyda et al.

(10) Patent No.: US 10,675,761 B2
(45) Date of Patent: Jun. 9, 2020

(54) MODE ARCHITECTURE FOR GENERAL PURPOSE ROBOTICS

(71) Applicant: MAGIC LEAP, INC., Plantation, FL (US)

(72) Inventors: Frederick Dennis Zyda, Redwood City, CA (US); Jeffrey Steven Kranski, San Jose, CA (US); Vikram Chauhan, San Diego, CA (US)

(73) Assignee: Magic Leap, Inc., Plantation, FL (US)

( * ) Notice: Subject to any disclaimer, the term of this patent is extended or adjusted under 35 U.S.C. 154(b) by 256 days.

(21) Appl. No.: 15/785,040

(22) Filed: Oct. 16, 2017

(65) Prior Publication Data

US 2018/0104819 A1  Apr. 19, 2018

Related U.S. Application Data

(60) Provisional application No. 62/408,354, filed on Oct. 14, 2016.

(51) Int. Cl.
*B25J 9/16* (2006.01)
*G05B 19/042* (2006.01)

(52) U.S. Cl.
CPC .......... *B25J 9/1682* (2013.01); *B25J 9/1658* (2013.01); *G05B 19/042* (2013.01); *G05B 19/0426* (2013.01); *G05B 2219/31076* (2013.01); *G05B 2219/40397* (2013.01)

(58) Field of Classification Search
CPC ......... B25J 9/1682; G05B 2219/31076; G05B 19/042

USPC .......... 700/248, 245, 11, 12, 86; 706/21, 47; 901/1, 46
See application file for complete search history.

(56) References Cited

U.S. PATENT DOCUMENTS

| | | | |
|---|---|---|---|
| 2008/0085048 A1* | 4/2008 | Venetsky | G06K 9/00355 382/153 |
| 2011/0054689 A1* | 3/2011 | Nielsen | G05D 1/0088 700/258 |
| 2016/0243709 A1* | 8/2016 | Ganz | B25J 9/1612 |
| 2017/0374360 A1 | 12/2017 | Kranski et al. | |

* cited by examiner

*Primary Examiner* — Dalena Tran
(74) *Attorney, Agent, or Firm* — Vista IP Law Group LLP

(57) ABSTRACT

An improved method, system, and apparatus is provided to implement a general architecture for robot systems. A mode execution module is provided to universally execute execution modes on different robotic system. A system includes an execution module that receives software instructions in a normalized programming language. The system also includes an interface having a translation layer that converts the software instructions from the normalized language into robot-specific instructions that operate in a particular robotic system. The system further includes a controller that is communicatively coupled to the interface, wherein the controller receives the robot-specific instructions. Moreover, the system includes a robotic device that is operatively controlled by the controller by execution of the robot-specific instructions.

30 Claims, 14 Drawing Sheets

MODE ARCHITECTURE FOR GENERAL PURPOSE ROBOTICS

CROSS-REFERENCE TO RELATED APPLICATIONS

The present application claims priority to U.S. Provisional Application Ser. No. 62/408,354, filed on Oct. 14, 2016, titled "MODE ARCHITECTURE FOR GENERAL PURPOSE ROBOTICS," the contents of which are hereby expressly and fully incorporated by reference in their entirety, as though set forth in full.

BACKGROUND

Robots are machines having both electrical and mechanical systems that allow the robot to be controllably managed to perform intended actions. For example, a robotic arm is a type of robot implemented as a mechanical arm, where the robotic arm may be controllably manipulated into a range of different positions and motions. The robotic arm may further include an end effector or gripping mechanism (such as a robotic hand) which can be used to pick up, hold, and release objects to be manipulated.

Robots may be used in any environment in which it is advantageous to have a mechanical entity automatically handle a task, especially a task that requires precise, repeatable manipulations of objects in the environment. In fact, modern manufacturing facilities often use a variety of robot devices at different stages of the manufacturing process to make, assemble, test, and/or package items being manufactured in the facility.

Robots typically include some sort of control system to control the operation of the robot. Computer code is often employed to guide the operation of the robot, where the computer code is embedded or otherwise loaded onto the robot, and execution of the computer code causes the robot to perform its intended operations.

FIG. 1A shows an example robotic arm 104 whose operation is controlled by a robot controller 102a. A control computer 124 may be used to interface with the robot controller 102a, where the control computer has a user interface to allow a user to send control instructions to the robot (such as "start" and "stop" instructions). The control computer 124 may also include software pertaining to the analysis/processing of data from the robot system.

Consider if the robot arm is employed by an organization as a test platform to perform a manufacturing function, but once the proof-of-concept for the manufacturing task has been approved, the organization would like to move to another type of robotic mechanism (such as a conveyor belt) to perform the manufacturing task. The robotic arm is often used to create and refine a given manufacturing task, given the wide range of control that can be achieved over the motions and articulations of the arm. However, robotic arms are comparatively more complicated and expensive compared to simpler and more specialized devices such as conveyor belts.

Therefore, once the concept behind the manufacturing task has been sufficiently developed using the robotic arm 104 of FIG. 1A, the organization may seek to implement that same task on the factory floor using the simpler device, such as conveyor belt 106 of FIG. 1B.

The issue is that each robot manufacturer typically provides its own unique programming environment to allow its customers to create and install a software application to control the operation of the robot. The robot manufacturer may include a toolkit of functionality that may be called from the software application. In some cases, the software may be implemented using a general purpose programming language (such as Java or C), and on other cases, a specialty software language may need to be employed to create the software application.

However, when implementing a new robot from a different/second robot manufacturer, that second robot manufacturer will likely provide its own programming environment that is different from the programming environment provided by the first manufacturer. This means that users that seek to use a different robot to perform a function may need to engage in a new grounds-up process to create the software for the different/new/second robot, even if the function to be performed by the second robot is similar or identical to the first robot.

In the situations of FIGS. 1A and 1B, this means that even after a first custom application 104a was fully created for the system of FIG. 1A to control the robotic arm 104, a second entirely new and custom application 104b may need to be created for the system of FIG. 1B to control the conveyor belt 106—even if there is a substantial overlap of functionality between custom applications 104a and 104b.

This situation raises numerous issues for the typical organization. First, since each robot's programming environment is likely to be complex and different from any other type of robot's programming environment, the typical user that seeks to develop software for a robot normally requires a significant investment in training and experience to allow for a competent background to safely and effectively develop the robot's software. Indeed, the robot can be a very dangerous piece of hardware that is capable of destroying itself and things around it at high speed. Thus, it is not advisable to allow a user to develop a custom application for the robot unless that user has been fully trained to do so. However, this severely limits the scope and/or number of users within an organization that are eligible to develop programming for the robots, especially if a number of different robots systems are used within the organization.

Another issue that may exist is that the custom computer code may include information that is considered sensitive and/or proprietary by the organization. For example, the robot may be employed to engage in a manufacturing process where the manufacturing/operating processing and/or conditions are embedded into the operating software, and that information about manufacturing process or operating conditions are considered trade secrets. However, if the robot is being operated and/or provide by a third party (such as a third party contract manufacturer), then a security risk may exist with respect to the organization's trade secretes since the third party would potentially have access to the robot and its custom computer code.

Therefore, for at least the above reasons, there is a need for an improved approach to implement software for robotics systems.

SUMMARY

Embodiments herein provide an improved method, system, and apparatus to generate an architecture to implement execution modes on robotic systems. In the architecture, a mode execution module is provided to execute execution modes on the robotic system.

In one embodiment, a system includes an execution module that receives software instructions in a normalized programming language. The system also includes an interface having a translation layer that converts the software instructions from the normalized language into robot-specific instructions that operate in a particular robotic system. The system further includes a controller that is communicatively coupled to the interface, wherein the controller receives the robot-specific instructions. Moreover, the system includes a robotic device that is operatively controlled by the controller by execution of the robot-specific instructions.

In one or more embodiments, the software instructions include one or more execution modes corresponding to at least one of an enter mode, an exit mode, and a trigger mode. The system may also include a second interface that converts the software instructions from the normalized language into second robot-specific instructions that are sent to a second controller to operatively control a second robotic device, where the second robotic device corresponds to a different type of device from the robot device. The second robot-specific instructions for the second robotic device may correspond to a different set of programming instructions from the robot-specific instructions for the robotic device.

In one or more embodiments, the execution module includes a mode selection module, a mode instruction processing module, and a controller interface module. The mode selection module may select a specific mode based on a mode selection instruction. The mode instruction processing module may determine a specific combination or sequence of mode instructions to be issued to the controller to perform a desired operation. The controller interface module may issue one or more API calls corresponding to the particular robotic system that are sent to the controller. At least one of safe entry points or safe exit points may be established for entry or exit of modes.

In one or more embodiments, the system also includes a rulebase having a set of rules that identifies acceptable or unacceptable sequences of modes for one or more robotic systems. The set of rules may be accessed to determine where a selected mode of operation for the robotic device is acceptable as a next mode of operation. The controller may include a real-time operating system that controls a motor driver to operate the robotic device. The execution module may be loaded as an application onto the controller.

In one or more embodiments, the controller includes both a real-time operating system (RTOS) and a user-space operating system (OS). The RTOS may control a motor driver to operate the robotic device. The user-space OS may provide user-specified commands to the RTOS. The interface may issue API calls that are understandable by a manufacturer-provided robot application layer within the user-space OS to execute the software instructions.

In one or more embodiments, the controller includes a thin interface layer and mode control functionality is located within a mode control/select layer that is located at a control application at a control computer. The interface may have functionality to communicate with the mode control/select layer and to deliver the robot-specific instructions to a RTOS. The execution module may be implemented as a loadable kernel module (LKM) within a RTOS at the controller.

In another embodiment, a method includes receiving software instructions for a robotic device in a normalized programming language. The method also includes converting the software instructions from the normalized language into robot-specific instructions that operate in a particular robotic system corresponding to the robotic device. The method further includes controlling the robotic device by execution of the robot-specific instructions.

In one or more embodiments, the software instructions include one or more execution modes corresponding to at least one of an enter mode, an exit mode, and a trigger mode.

In one or more embodiments, the method also includes identifying a selection of a selected mode. The method further includes determining whether the selected mode is acceptable in light of a current state of the robotic device. Moreover, the method includes placing the robotic device into a safe exit state or location for a current mode if the selected mode is acceptable. In addition, the method includes stopping the current mode. The method also includes placing the robotic device into a safe entry state or location for the selected mode. The method further includes starting the selected mode.

In one or more embodiments, a set of rules in a rulebase are accessed to determine where the selected mode for the robotic device is acceptable as a next mode of operation. If the selected mode is not acceptable, then a determination may be made of an alternative instruction that is an acceptable alternative to the selected mode. The alternative instruction may be determined by at least one of checking the rulebase, performing manual intervention, or using a machine learning system. Within a single mode, the safe exit state or location may be different from the safe entry state or location. Between different modes, the safe exit state or location or safe entry state or location for a first mode may be different from the safe exit state or location or safe entry state or location for a second mode.

In one or more embodiments, once a new mode is entered, a waiting period is entered for a trigger. The robotic device may perform a predefined mode function corresponding to the trigger. The software instructions may be converted from the normalized language into robot-specific instructions by generating a set of API calls that correspond to the particular robotic system corresponding to the robotic device.

In still another embodiment, a computer program product embodied on a computer readable medium, the computer readable medium having stored thereon a sequence of instructions which, when executed by a processor causes the processor to execute a method including receiving software instructions for a robotic device in a normalized programming language. The method also includes converting the software instructions from the normalized language into robot-specific instructions that operate in a particular robotic system corresponding to the robotic device. The method further includes controlling the robotic device by execution of the robot-specific instructions.

In one or more embodiments, the software instructions includes one or more execution modes corresponding to at least one of an enter mode, an exit mode, and a trigger mode.

In one or more embodiments, the sequence of instructions further executes the method also including identifying a selection of a selected mode. The method further includes determining whether the selected mode is acceptable in light of a current state of the robotic device. Moreover, the method includes placing the robotic device into a safe exit state or location for a current mode if the selected mode is acceptable. In addition, the method includes stopping the current mode. The method also includes placing the robotic device into a safe entry state or location for the selected mode. The method further includes starting the selected mode.

In one or more embodiments, a set of rules in a rulebase are accessed to determine where the selected mode for the robotic device is acceptable as a next mode of operation. If the selected mode is not acceptable, then a determination may be made of an alternative instruction that is an acceptable alternative to the selected mode. The alternative instruction may be determined by at least one of checking the rulebase, performing manual intervention, or using a machine learning system. Within a single mode, the safe exit state or location may be different from the safe entry state or location. Between different modes, the safe exit state or location or safe entry state or location for a first mode may be different from the safe exit state or location or safe entry state or location for a second mode.

In one or more embodiments, once a new mode is entered, a waiting period is entered for a trigger. The robotic device may perform a predefined mode function corresponding to the trigger. The software instructions may be converted from the normalized language into robot-specific instructions by generating a set of API calls that correspond to the particular robotic system corresponding to the robotic device.

Further details of aspects, objects, and advantages of the invention are described below in the detailed description, drawings, and claims. Both the foregoing general description and the following detailed description are exemplary and explanatory, and are not intended to be limiting as to the scope of the invention.

BRIEF DESCRIPTION OF THE DRAWINGS

In order that the present invention is better understood, some embodiments will now be described, by way of example only, with reference to the accompanying drawings.

DETAILED DESCRIPTION

Various embodiments will now be described in detail with reference to the drawings, which are provided as illustrative examples of the invention so as to enable those skilled in the art to practice the invention. Notably, the figures and the examples below are not meant to limit the scope of the present invention. Where certain elements of the present invention may be partially or fully implemented using known components (or methods or processes), only those portions of such known components (or methods or processes) that are necessary for an understanding of the present invention will be described, and the detailed descriptions of other portions of such known components (or methods or processes) will be omitted so as not to obscure the invention. Further, various embodiments encompass present and future known equivalents to the components referred to herein by way of illustration.

Figure 1A:
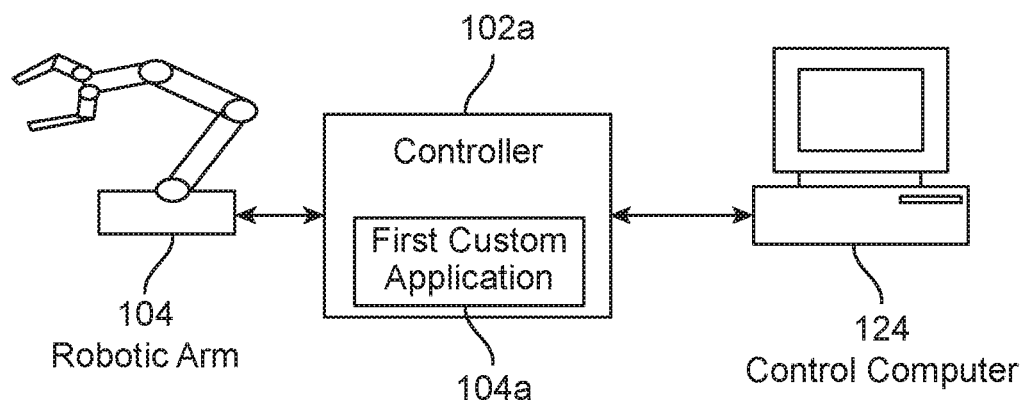
FIGS. 1A and 1B illustrate example robot systems.
Figure 1B:
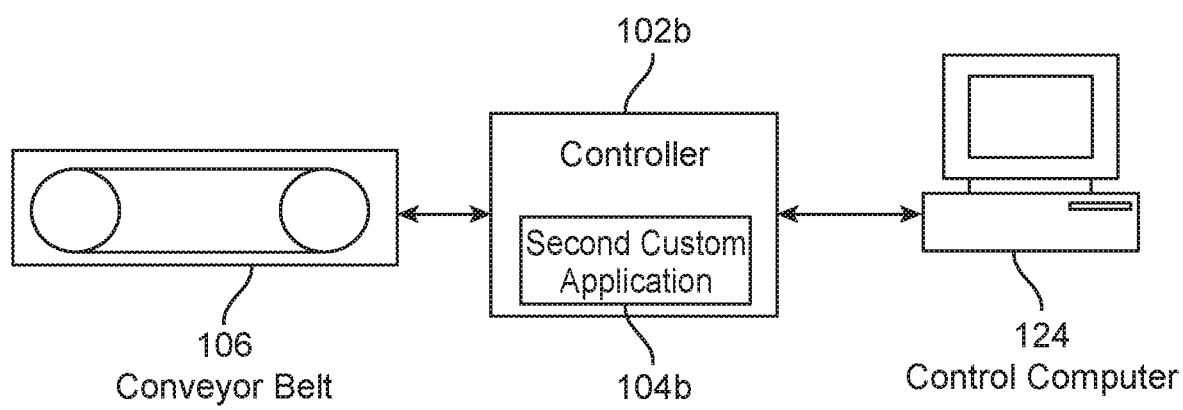
Figure 2:
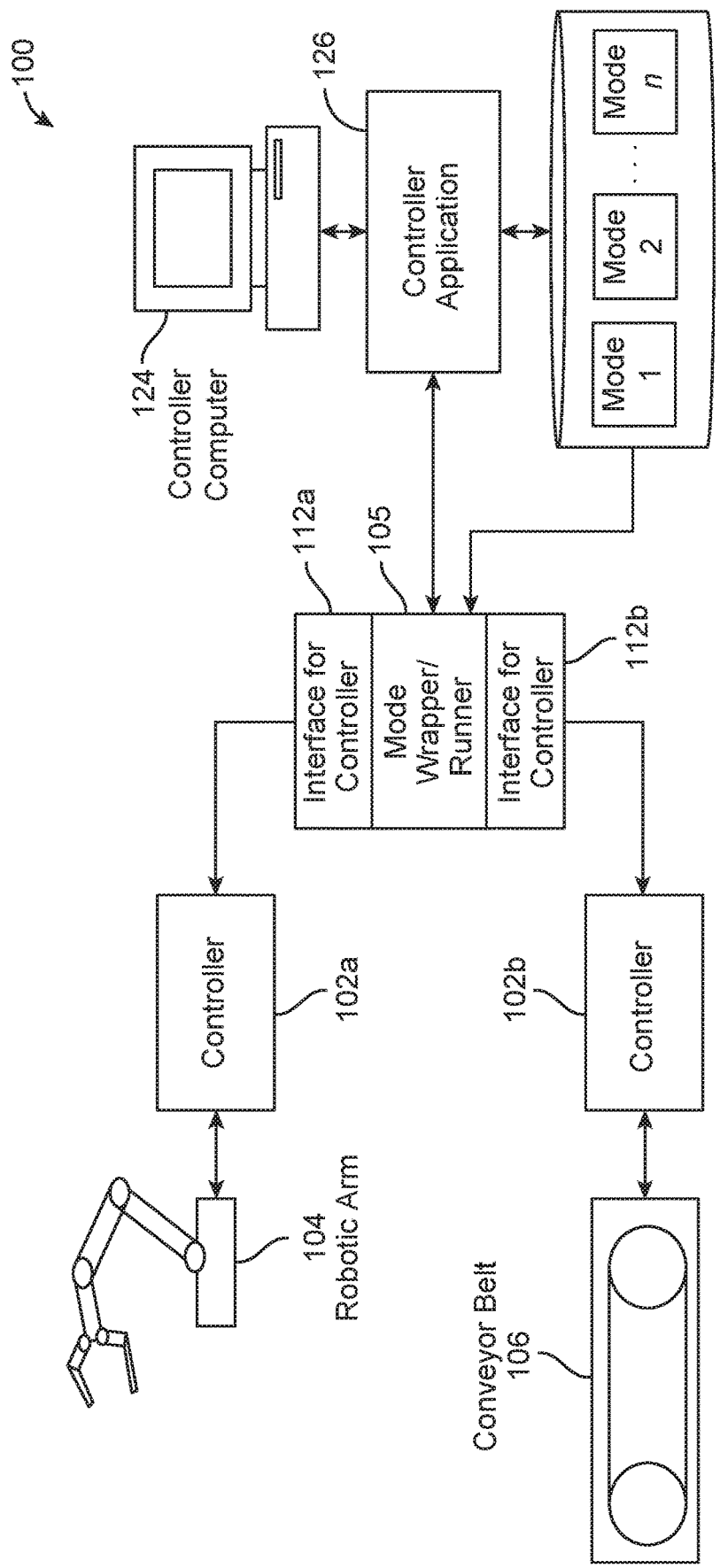
FIG. 2 illustrates an example robotic control architecture according to some embodiments.

Embodiments provide an improved method, system, and apparatus to general architecture to implement execution modes on robotic systems. FIG. 2 illustrates an example robotic control architecture 100 according to some embodiments. In architecture 100, a mode execution module 105 (which may also be referred to herein as either a "mode runner" module or "mode wrapper" module) is provided to execute execution modes (also referred to herein as "modes") on any of several different robotic systems, such as robotic arm 104 or conveyor belt 106.

The modes correspond to any sequence of robotic instructions that is coded into a programming language that is recognizable by the mode execution module 105. In some embodiments, the modes are coded with a normalized set of API (applications programming interface) calls that are recognizable by the mode execution module 105.

The modes themselves can be of any arbitrarily complexity. In some embodiments, a mode defines a "enter mode" and an "exit mode" method. These methods are called to allow the mode to enter the desired workspace safely and return the robot to a safe state as needed. This means that the modes do not need to know anything about each other and the "mode runner" that selects which mode is currently running does not need to know anything about what the modes are doing. This also means modes can be added or removed from the set of available modes without having to modify any other code. A mode may also define an "on trigger" method that signals it should do something.

Interfaces are defined for each of the specific robot controllers that may be employed within the architecture 100. Each interface includes a translation layer to convert instructions within the modes that are in a normalized language into the specific instructions that are needed to implement a desired action within a particular robotic system. For example, when a given robotic system exposes its functionality using a set of API calls, the interface may operate to translate mode instructions into the appropriate API call. In the current example architecture, a first interface 112a is defined to interact with controller 102a for robotic arm 104, while a second interface 112b is defined to interact with controller 102b for conveyor belt 106.

In operation, a user at control computer 124 operates a controller application 126 to manage the operations of one or more of the robot systems. The controller application 126 relays commands to the mode execution module 105 to execute any of one or more modes 1, 2, . . . , n on a given robot system. The properly formatted instructions for the selected mode(s) are relayed to the appropriate controller for the target robot system using the interface that is specifically developed for the targeted robot system.

The idea of this approach is to make the modes as opaque to the outside world as possible and in so doing make them interchangeable. This permits users to develop code in a generic manner using normalized function calls, regardless of the specific robot system on which that mode may eventually be executed upon. As such, there is no longer any need for each user developing code to be required to be an expert or have extensive specialized training on each of the robot systems that the code is to be operated upon.

Conventional robot control software do not operate in this manner since known robot systems are implemented using specialized development environments specific to each given robot system. Most robots either let one control their every movement exactly via some interface or run in an open loop. The current approach allows the user to time-synchronize command and execution on an as-needed basis without being required to implement detailed or high frequency positioning of the robot. This provides exactly the level of control over the robot that is needed for a large number of tasks including device calibration, data collection and device testing. This is also the only known robotic architecture that is implemented with the purpose of allowing programmers who know very little about a specific robot system (e.g., robot arms) to make the robot perform useful work with the absolute minimum amount of training or supervision.

This architecture allows the user to quickly develop robot applications that connect to various pieces of software. This is facilitated by defining a very limited set of commands (e.g., normalized commands) that can be easily extended as new modes are added, without being so tied to specific robot hardware systems. In this way, an organization can perform initial development activities using a first robot system, and then very quickly leverage the existing codebase of the modes to transition to a new robot system for production purposes.

The current approach also allows limited safe access to the robot to any users within the organization. As previously noted, the robot is a potentially dangerous piece of hardware that is capable of destroying itself and things around it at high speed, but it is also a very useful tool to have around. The present system implements a limited set of commands that users with no training in robot programming and minimal safety training could send to the robot while minimizing or eliminating the risk of breaking anything in the area of the robot. The modes in this case limit the set of actions the robot can take to a well-known set of actions that can be vetted by a competent robot programmer without being forced to limit the exact sequence of events that the novice robot user might attempt. In addition, the modes can be executed very safely since the mode execution module acts as a "wrapper" around each of the modes, and the mode execution module includes oversight functionality to ensure that the executing modes do not perform operations in an unsafe or inappropriate manner. For example, the mode execution module operates to make sure any start of a new mode causes the previously executing mode for a given system to exit in a safe and appropriate robotic state, and also ensure that the new mode does not start until the robot is in a safe starting state.

As previously noted, another problem with conventional solutions is that the computer code to operate a robot controller may include information that is considered sensitive and/or proprietary. The present approach provides an architecture that allows for flexible robot routine development while limiting the communication protocol to a small set of commands. This permits the robot to be treated as a "black box" from the perspective of the control computer, so that the proprietary or sensitive information is maintained at the control computer instead of at the robotic system. This is particularly important since many robotic systems run on rudimentary or antiquated operating systems that may be vulnerable to outside attackers, while the control computers may be implemented using any computing system having the most up-to-date security controls.

Another advantage of the current approach is that it allows an organization to efficiently implement competing ideas for the same robot action and run experiments where data is collected in exactly the same way, varying only by the mode that is selected. This will allow an organization to run head-to-head experiments in a way that was previously unavailable.

Figure 3:
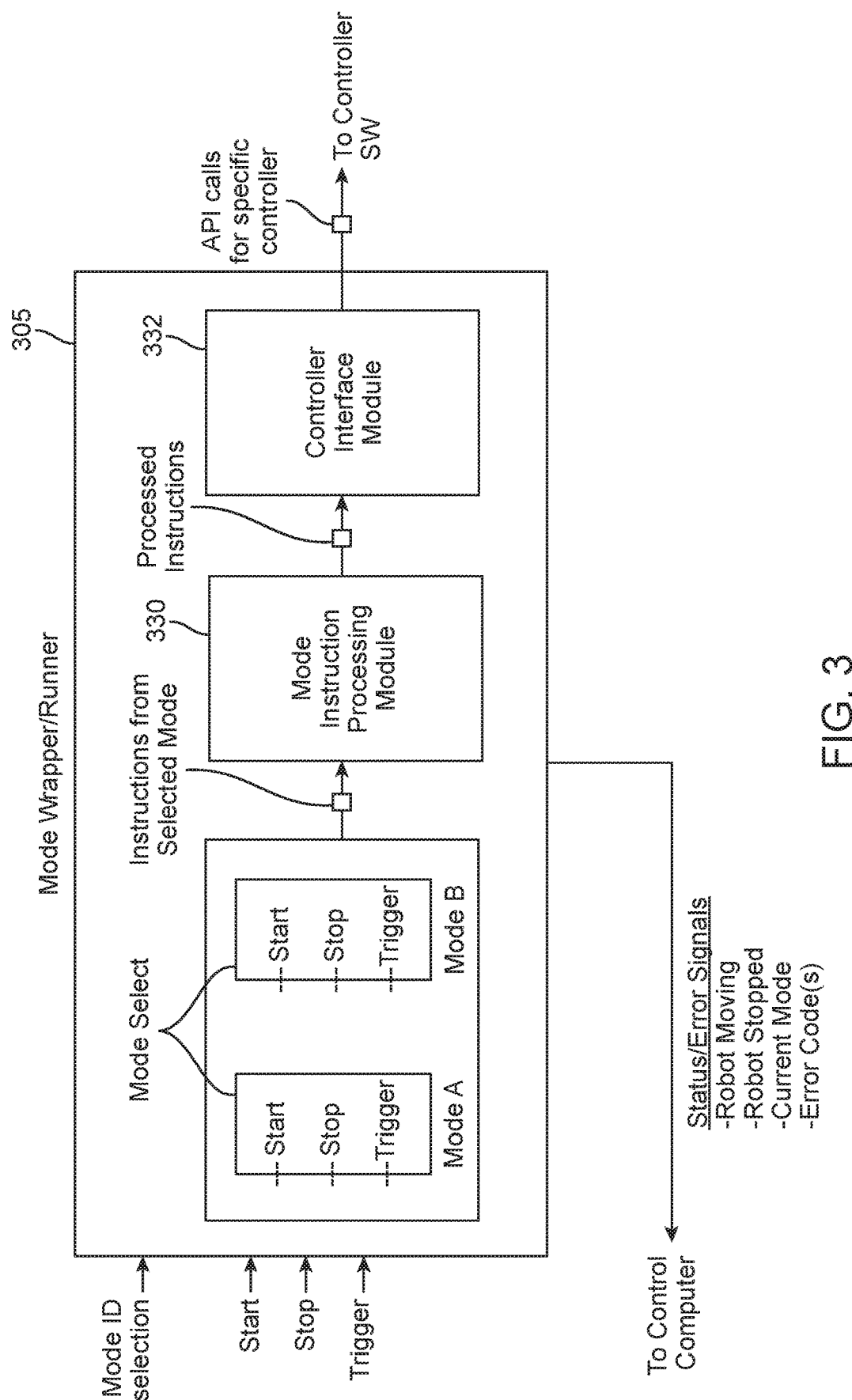
FIG. 3 illustrates the internal architecture of the mode execution module according to some embodiments.

FIG. 3 illustrates the internal architecture of the mode execution module 305 according to some embodiments. The mode execution module 305 may operate to select and execute any number of different modes. While this figure illustratively shows two modes (Mode A and Mode B), it is noted that any number of different modes may be loaded and/or executed by the mode execution module in various embodiments.

Various types of different commands may be provided by a control computer to operate the mode execution module. For example, a "change mode" command may be provided to specify the desired mode the robot should select. A "mode select" function is performed by the mode execution module to select the mode having the Mode ID/name provided as part of the change mode command.

Figure 8:
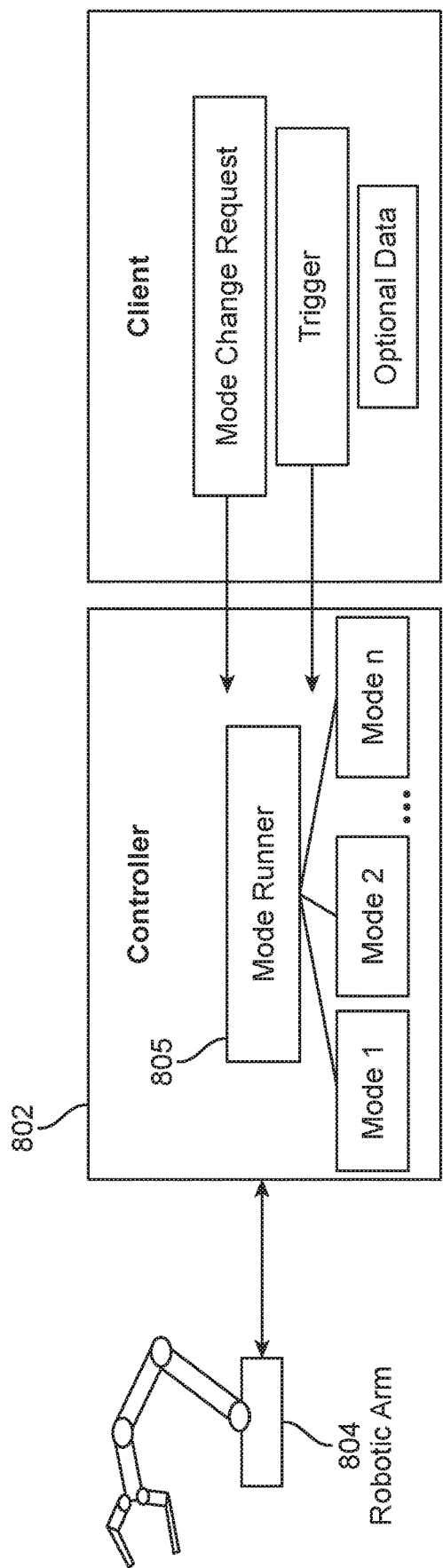
FIG. 8 illustrates an example robot architecture receiving client input according to some embodiments.
Figure 9:
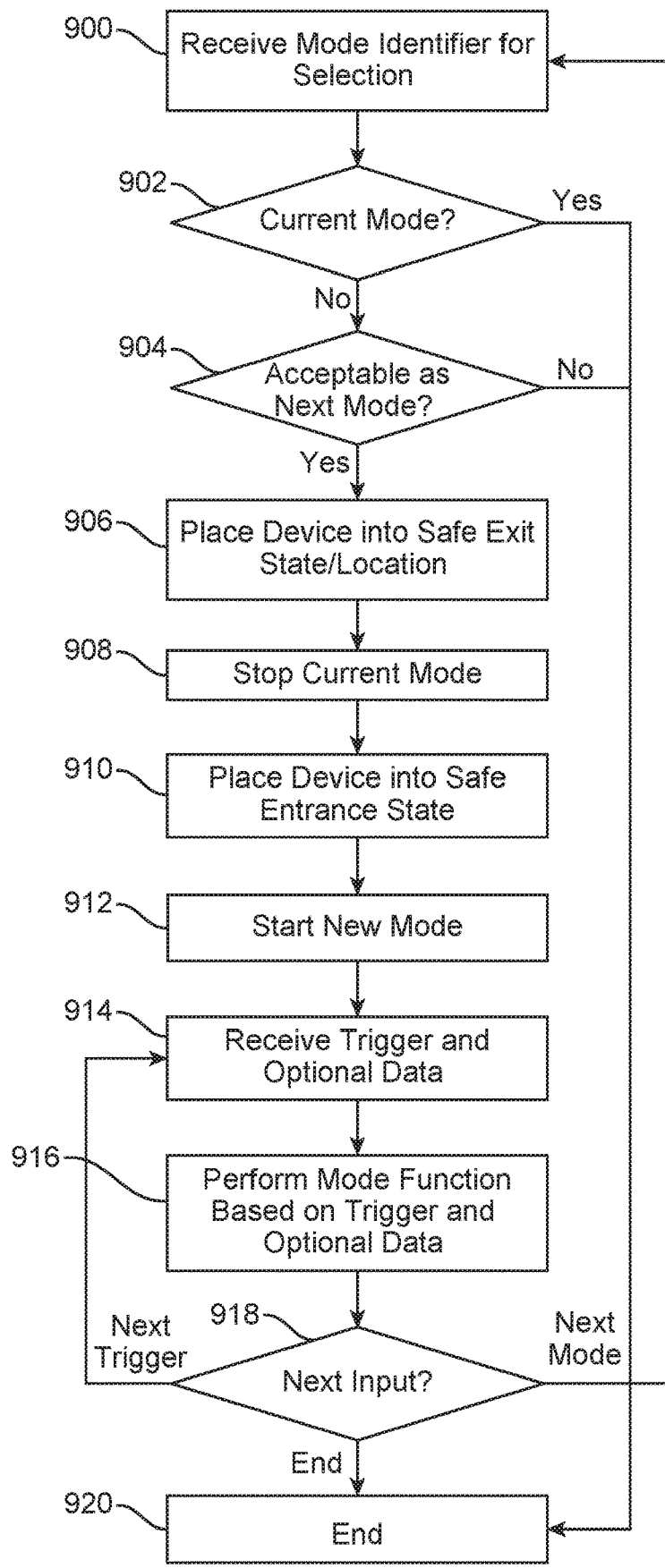
FIG. 9 shows a flowchart of an approach to implement a mode change operation according to some embodiments.

For the selected mode, a "trigger" command can be provided to instruct the selected mode to perform some action (see FIGS. 8 and 9). The "Start" and "Stop" commands are provided to start and stop the execution of the selected mode or actions within the mode. It is noted that the details of what a specific mode does when triggered are dependent upon the program code that is configured within the mode software.

The individual instructions from the current mode are sent for execution to a mode instruction processing module 330. It is this module that receives the individual instruction from the current mode, and issues those instructions as appropriate to the robot controller. This module includes a set of configuration settings and/or rules that define how and whether the mode instructions, or specific combination/sequence of the mode instructions, are to be issued to the robot controller to perform a desired operation. It is this approach to process the instructions that allows a user to create a generic mode using the limited and normalized set of commands, and yet still be able to have those limited commands be safely useable with a wide range of target robot systems.

Once the appropriate set of instructions have been identified and processed, the processed instructions are sent to the controller interface module 332 for delivery to the robot system, e.g., to the specific application or RTOS (real time operating system) that is configured at the robot system to receive instructions. In some embodiments, the controller interface module 332 issues the appropriate API calls to effect the desired operations for the modes.

Various types of messages may be provided from the mode execution module 305 to the control computer. For example, status messages may be provided to indicate whether the robot is currently moving or if the robot is currently stopped. In addition, the identity of the current mode may be provided upon the request of the control computer. To the extent any errors are detected, error messages and/or error codes may be sent to the control computer. The errors may relate to errors caused by the mode execution, or may pertain to the status/operation of the robot itself.

According to some embodiment, when selecting a new mode or changing between modes, controls are put into place to ensure that a safe transition can occur between the old mode and the new mode, e.g., by implementing safe entry and exit points for mode changes. This allows, for example, the user to implement and test different combinations or ordering of modes without fear of causing damage to the robot machinery.

Figure 4:
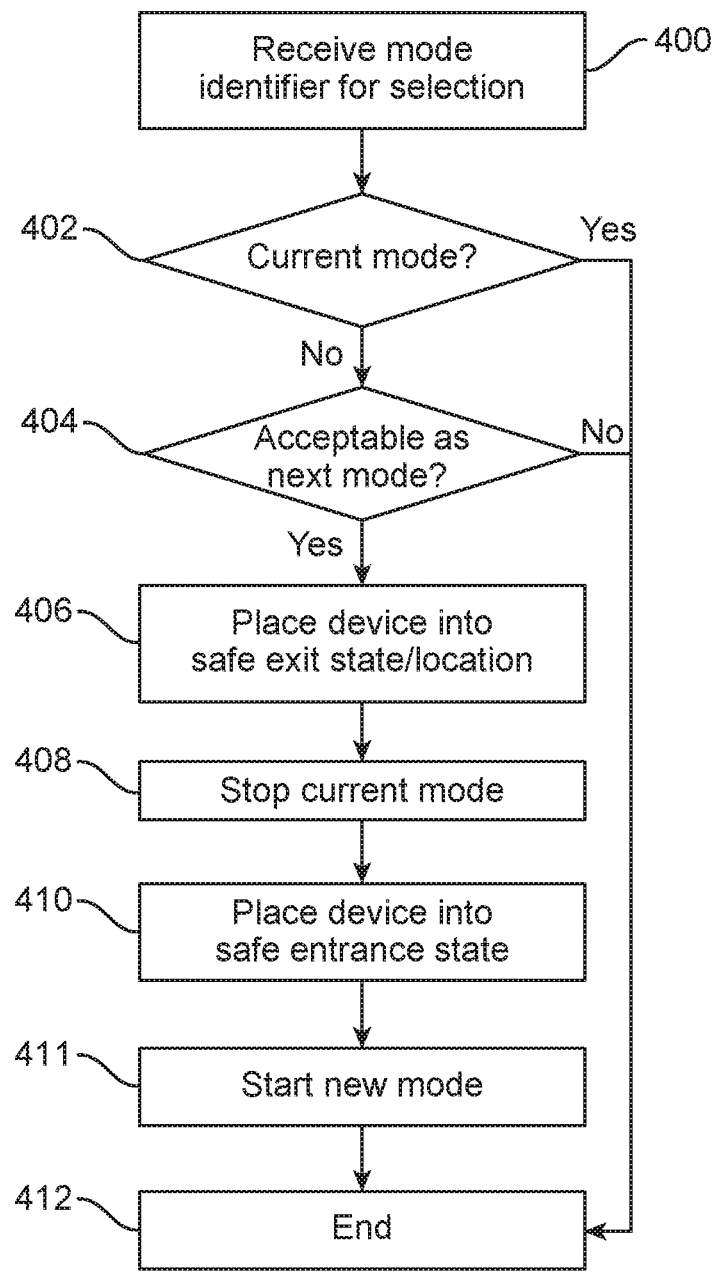
FIG. 4 shows a flowchart of an approach to implement a mode change operation according to some embodiments.

FIG. 4 shows a flowchart of an approach to implement the mode change operation to implement safe mode-to-mode transitions according to some embodiments. At 400, a mode change operation is received for processing that includes the identifier of the new mode. Any type of identifier may be suitably used within the system to identify modes, including for example, mode names, mode ID values, and/or mode file/pathnames.

At 402, a determination is made whether the mode identifier corresponds to the currently executing mode. This may occur, for example, if the user has mistakenly selected the same mode that is already running for the change mode operation. If so, then the process ends at 412.

It is possible that certain modes cannot follow certain other modes, e.g., because of incompatibilities between the intended operation of a first mode and the intended operation of a second mode. Therefore, an optional step at 404 is to check whether the selected next mode is acceptable as the next mode. This step may be implemented, for example, by checking against a rulebase having a set of rules that identifies the acceptable and/or unacceptable sequences of modes for intended robotic systems. The rules within the rulebase may be provided from any suitable source, e.g., from the robot manufacturer, from the provider of the mode wrapper/runner software, from users/operators, open source, or any combination thereof. In some embodiments, the rules may be modified over time, e.g., from editing performed by users/operators and/or by using a machine learning/expert system infrastructure to allow automated learning over time of acceptable mode combinations.

If the next mode is an acceptable mode, then at 406, the robot device is placed into a safe exit location/state for the current mode. In some embodiments, the same consistent exit location/state is defined for all modes that operate for a given robot system, e.g., stopping the motion of the robot and placing the robot into a designated location/position. In an alternative embodiment, certain modes can be configured to have an exit location/state that is individual to that mode. Once the robot has been placed into a location/state that is safe, then at 408, the current mode is stopped and exited.

Next, at 410, the robot device is placed into a safe starting state for the new mode. As before, some systems may include a single universal starting location/state that is applicable for all modes. In the alternative, some or all of the modes may be configured to have individualized safe start locations/states. In some embodiments, safe start (and possibly stop) locations/states correspond to locations with a large amount of free space/volume around them, such that they can move to/from other start/stop locations without collisions en route. Safe start/stop locations/states may be distinct within a specific mode, as one may want to start an operation (e.g., camera calibration pass) with the robot/camera starting at a location (e.g., one side of a target) and stopping at another location (e.g., at the other side of the target). They may also differ between modes. For example, in Mode A, the operation may be placing an object in bin A, and so Mode A may have a stop space positioned above bin A, and then Mode B may involve picking an object from bin B, so its start space may be above bin B. Once the robot has been placed into a state that is safe to start the mode, then at 411, the new mode is started.

Figure 5:
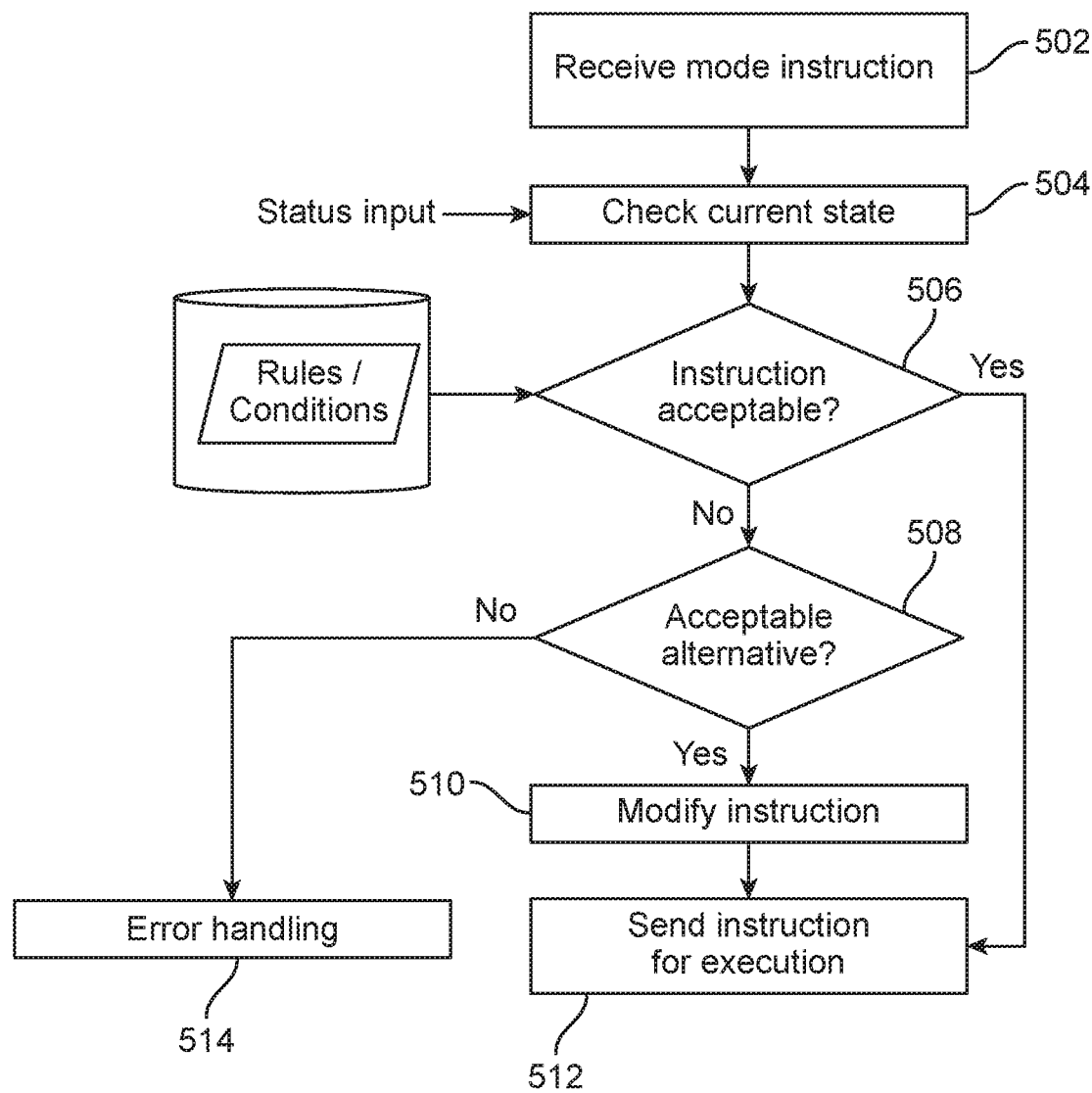
FIG. 5 shows a flowchart of an approach to implement a mode instruction processing module according to some embodiments.

FIG. 5 shows a flowchart of an approach to implement the mode instruction processing module 305 of FIG. 3. As previously noted, the individual instructions from the executing mode are sent for execution to the mode instruction processing module 305. The mode instruction processing module 305 is responsible for implementing the appropriate instructions to the robot device to implement the desired functionality of the mode instructions.

At 502, the mode instruction is received for execution, where the instruction corresponds to a selected command from a defined set of commands that are available to be placed into the mode. The current state of the robot device is then checked at 504.

At 506, a determination is made whether the mode instruction is appropriate in light of the current state of the robot device. In some embodiments, a set of rules from within a rulebase is checked to determine the applicability of a given mode instruction for a given robot state. For example, if the user includes a command in a mode that is actually intended to be used for a different robot system than is currently running, then this may present a compatibility problem for the mode instruction.

If the mode instruction is acceptable, then at 512, the instruction is sent to the robot device for execution. If the mode instruction is not acceptable, then at 508, an optional step can be taken to determine if there is an alternative instruction that is an acceptable alternative to the mode instruction that has been received. Any suitable approach can be taken to identify an acceptable alternative, e.g., by checking the rulebase, with manual intervention, or using a machine learning/expert system. If an acceptable alternative is identified, then the instruction is modified as appropriate at 510, and the modified instruction is then sent at 512 to the robot device for execution.

However, if the mode instruction is found to be unacceptable at 506 and, optionally, no acceptable alternative to the mode instruction is identified at 508, then the instruction is not executed. Instead, at 514, error handling is performed, e.g., to send an error message indicating the execution problem with the mode instructions.

Figure 6:
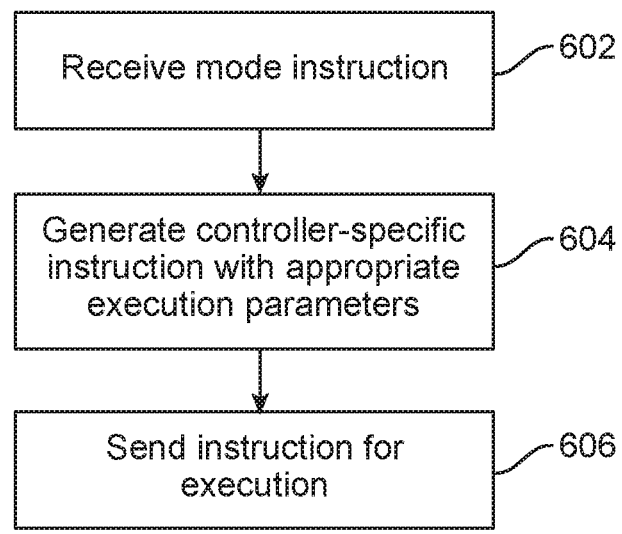
FIG. 6 shows a flowchart of an approach to implement a controller interface module according to some embodiments.

As previously discussed, once the appropriate set of mode instructions have been identified and processed, the processed instructions are sent to the controller interface module 332 for delivery to the robot system. FIG. 6 shows a flowchart of an approach to implement the controller interface module 332. At 602, the processed mode instructions are received for deliver to the robot controller.

At 604, controller-specific instructions are generated with appropriate execution parameters. For example, the robot system may be controllable using API calls that have been exposed by the robot manufacturer. In this situation, the controller interface module 332 issues the appropriate API calls to effect the desired operations for the mode instructions. At 606, the API calls are then sent to the robot system for execution.

Figure 7A:
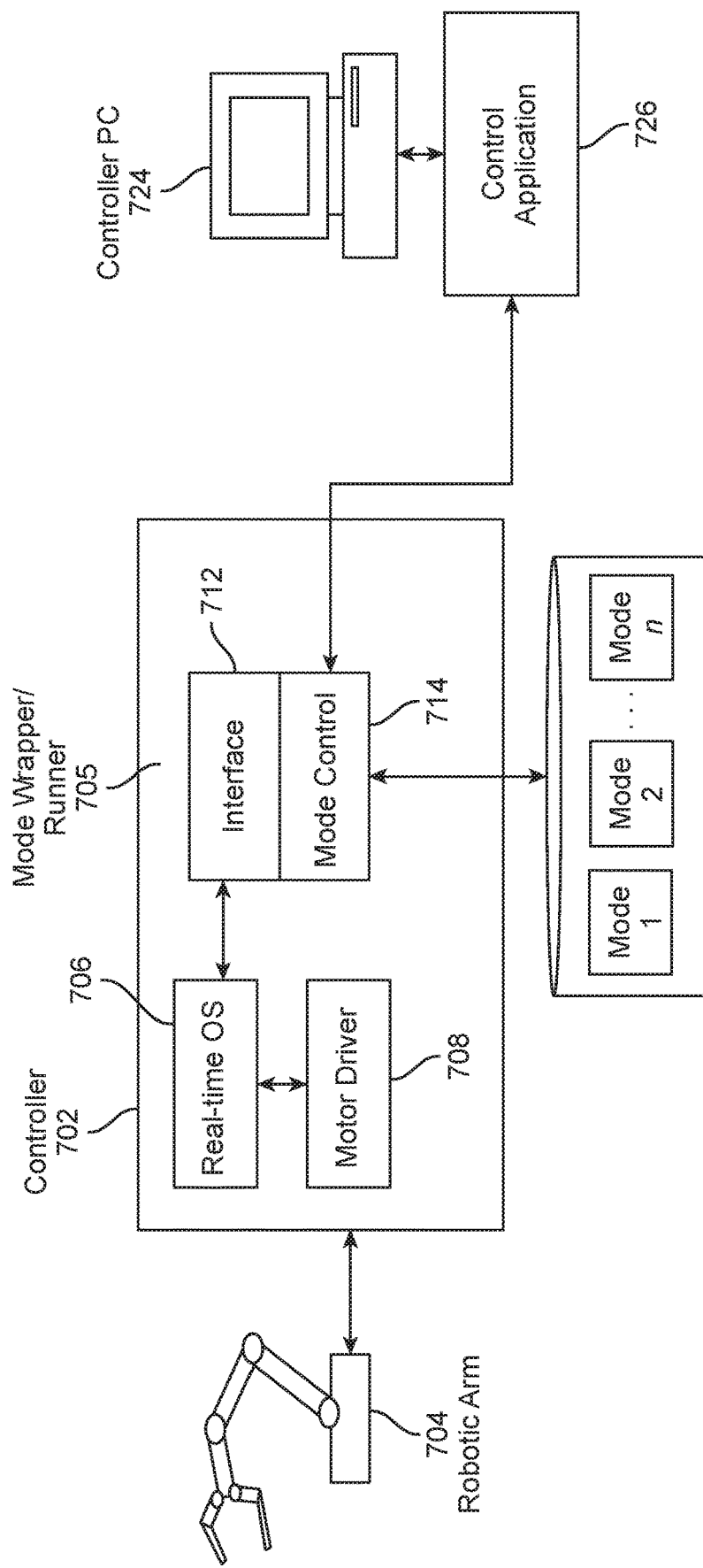
FIGS. 7A-D illustrate example robot architectures according to some embodiments.

The invention may be embodied into any suitable robot system or architecture. FIG. 7A shows an example architecture for a robotic arm 704 whose operation is controlled by a robot controller 702. Controller 702 includes a real-time operating system (RTOS) 706 that controls a motor driver 708 to control the operation of the robot arm 704. In this example architecture, the mode interface module 705 may be loaded as an application onto the controller 704. The mode interface module 705 includes a mode control portion 714 and an interface portion 712.

A control computer 724 may include a control application 726 to interact with the mode interface module 705. In particular, a user may use a user interface of the control application 726 at the control computer 724 to send control commands to the mode control portion 714 to select one of the modes 1, 2, . . . , n, and to provide specific commands such as "trigger", "start" and "stop" to the selected mode.

Figure 7B:
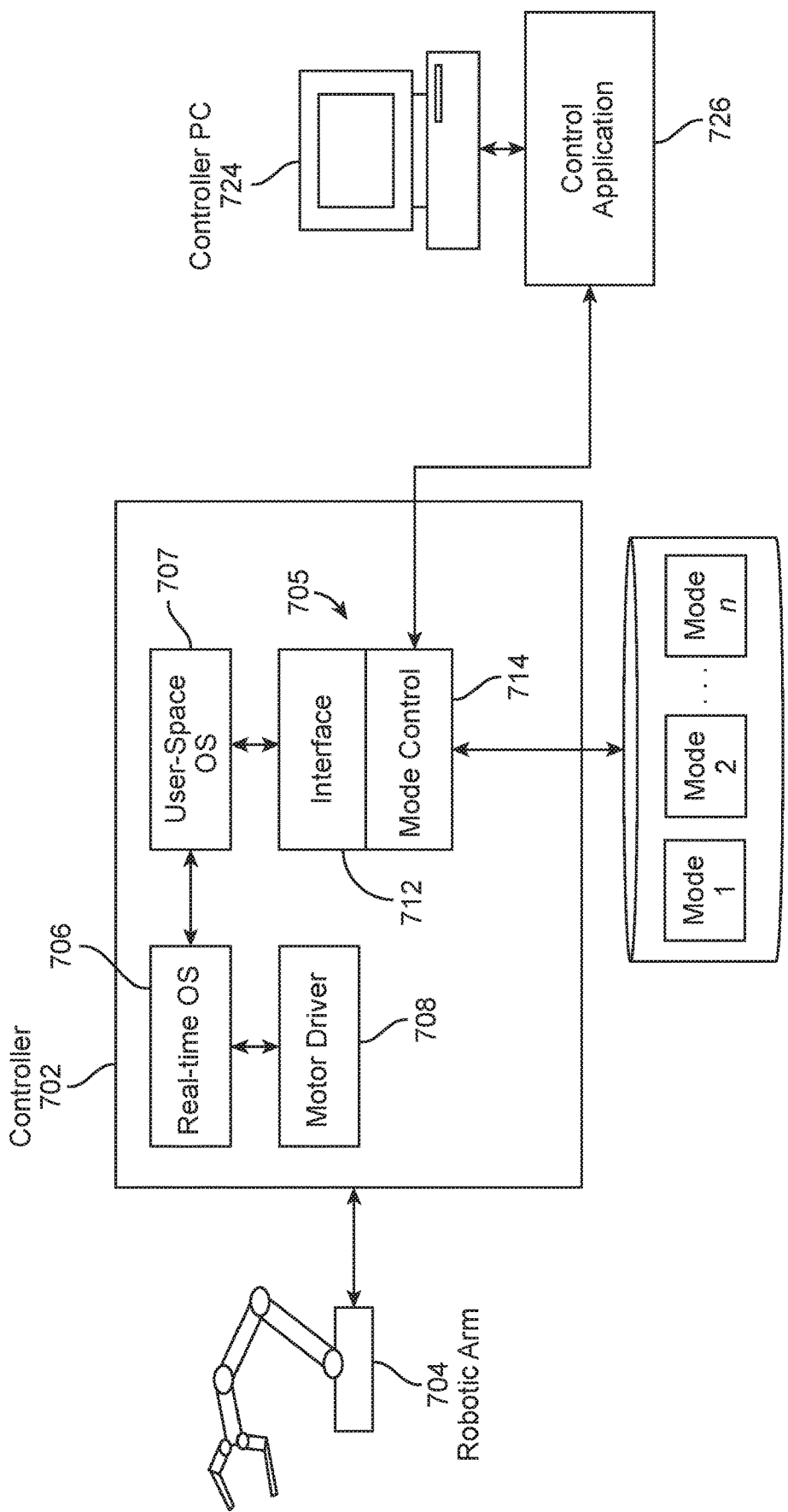

FIG. 7B shows an alternative architecture, where the controller 702 further includes a user-space OS 707 to provide user-specified commands to the RTOS 706. In this architecture, the interface portion 712 of the mode interface module 705 will interface with the user space OS 707 to provide the instructions to control the robot arm 704. The interface portion 712 will issue the appropriate API calls that are understandable by a manufacturer-provided robot application layer within the user-space OS to execute the desired commands.

Figure 7C:
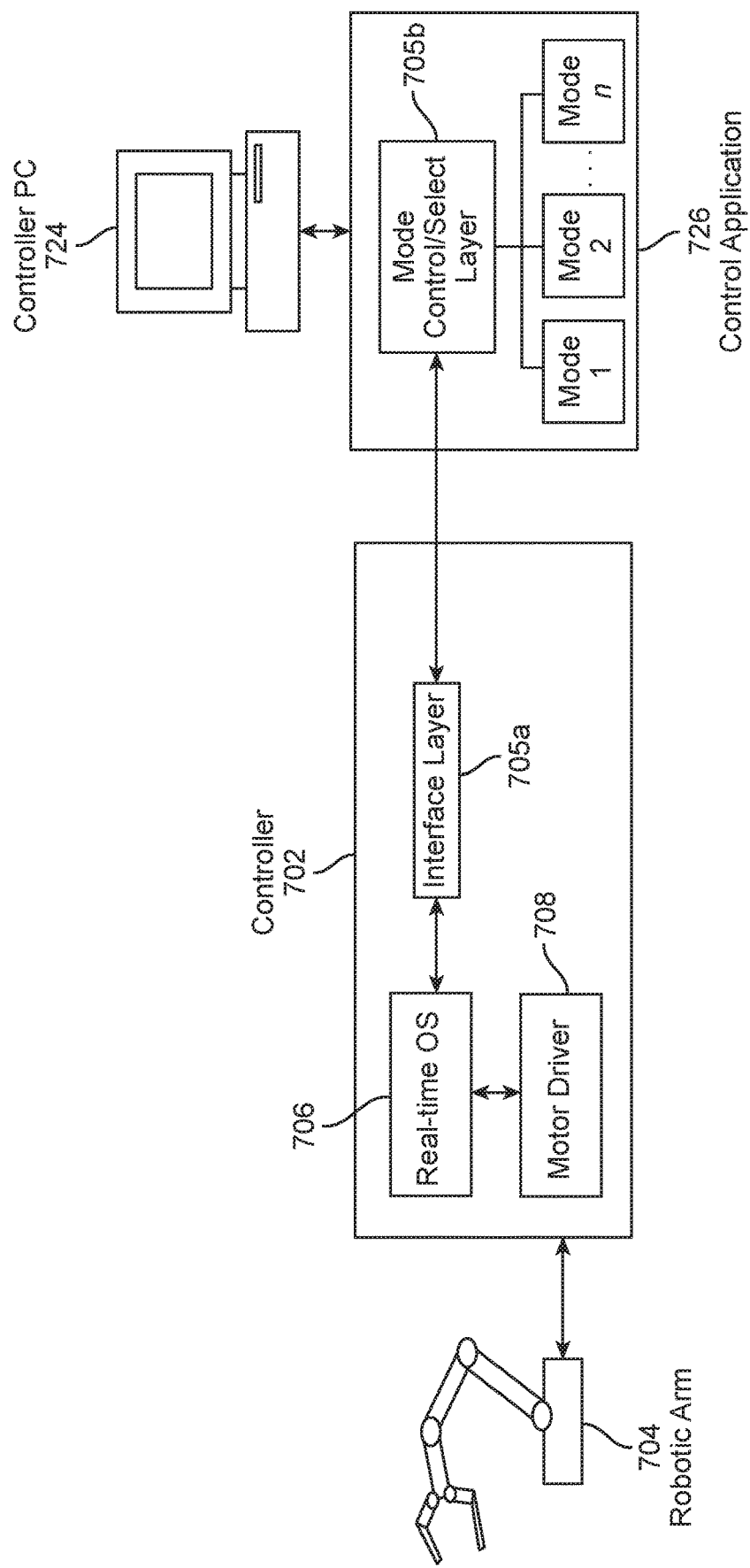

FIG. 7C shows another example architecture, where only a very thin interface layer 705a is located within the controller 704. Here, the majority of the mode control functionality is located within the mode control/select layer 705b that is located at the control application 726 at the control computer 724. The interface layer 705a only includes the minimum amount of functionality necessary to communicate with the mode control/select layer 705b, and to deliver/translate the robot-system specific commands to the RTOS 706. This approach provides the maximum amount of separation for any proprietary information between the robot system and the control system.

Figure 7D:
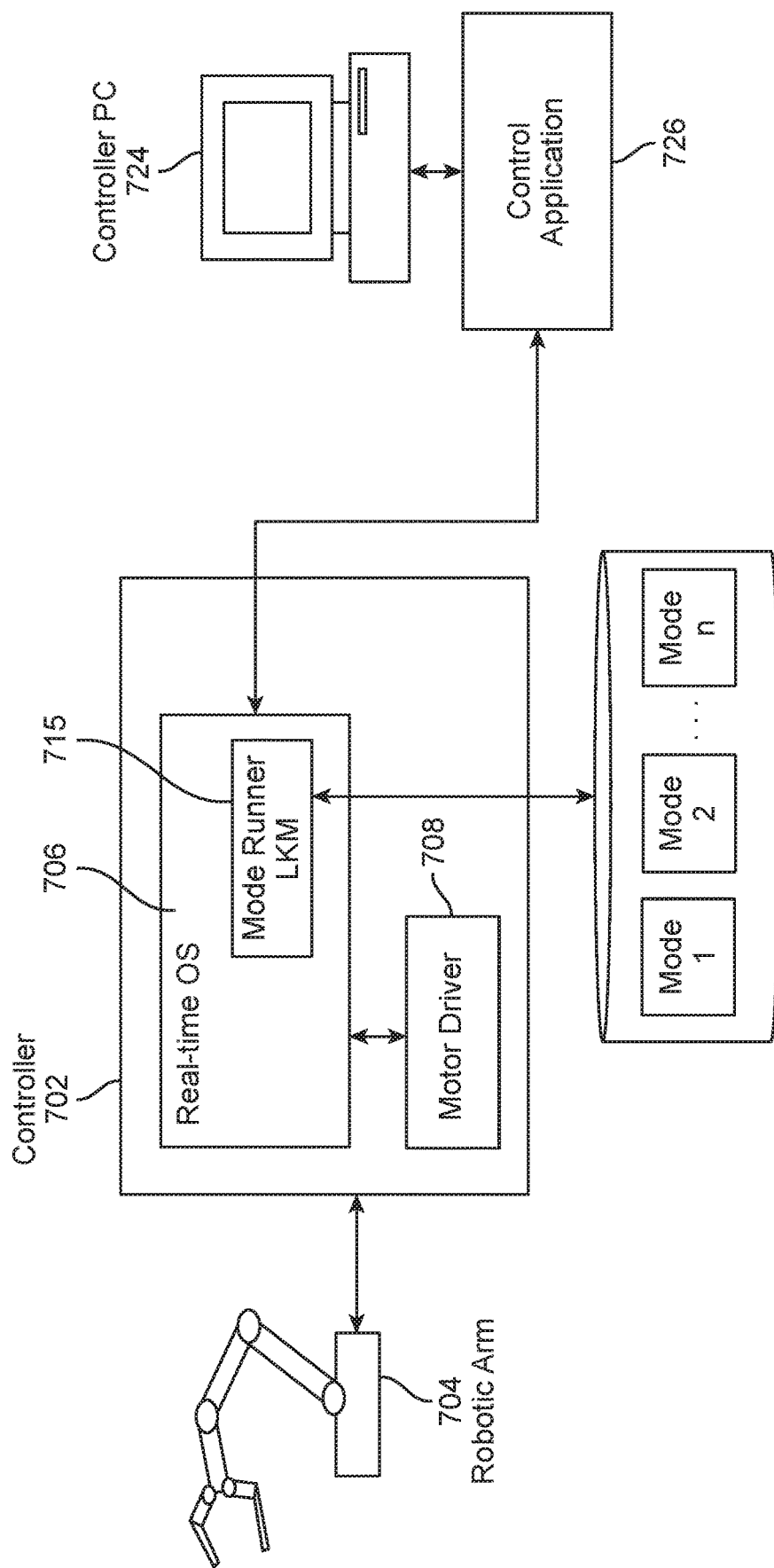

FIG. 7D shows yet another example architecture, where the mode execution module 715 is implemented as a loadable kernel module (LKM) within the RTOS 706 at the controller 702. A LKM is the specific type of module that can be loaded to extend the functionality of a kernel (such as a Linux kernel). To load the LKM module into a Linux kernel, an insmod call and/or a modprobe call is made that loads the OS module into the kernel. The LKM's initialization routine is executed right after it loads the LKM, where as part of initialization, the OS module loaded into the kernel will initialize and open up, for example, a named pipe to facilitate communications between the Real-time OS 706 and the LKM. This approach allows for a very high level of integration between the functions of the mode execution module 715 and the operations of the controller 702.

FIG. 8 shows an example architecture for a robotic arm 804 whose operation is controlled by a robot controller 702 using input from a client. The client may be a user or another computing system. Controller 702 includes a mode runner 805, which may be operated in modes 1 to n. The controller 702 can receive one or more mode change requests, triggers, and, optionally, data for use with a particular triggered function.

FIG. 9 shows a flowchart of an approach to implement the mode change operation to implement safe mode-to-mode transitions according to some embodiments. At 900, a mode change operation is received for processing that includes the identifier of the new mode. Any type of identifier may be suitably used within the system to identify modes, including for example, mode names, mode ID values, and/or mode file/pathnames.

At 902, a determination is made whether the mode identifier corresponds to the currently executing mode. This may occur, for example, if the user has mistakenly selected the same mode that is already running for the change mode operation. If so, then the process ends at 920.

It is possible that certain modes cannot follow certain other modes, e.g., because of incompatibilities between the intended operation of a first mode and the intended operation of a second mode. Therefore, an optional step at 904 is to check whether the selected next mode is acceptable as the next mode. This step may be implemented, for example, by checking against a rulebase having a set of rules that identifies the acceptable and/or unacceptable sequences of modes for intended robotic systems. The rules within the rulebase may be provided from any suitable source, e.g., from the robot manufacturer, from the provider of the mode wrapper/runner software, from users/operators, open source, or any combination thereof. In some embodiments, the rules may be modified over time, e.g., from editing performed by users/operators and/or by using a machine learning/expert system infrastructure to allow automated learning over time of acceptable mode combinations.

If the next mode is an acceptable mode, then at 906, the robot device is placed into a safe exit location/state for the current mode. In some embodiments, the same consistent exit location/state is defined for all modes that operate for a given robot system, e.g., stopping the motion of the robot and placing the robot into a designated location/position. In an alternative embodiment, certain modes can be configured to have an exit location/state that is individual to that mode. Once the robot has been placed into a location/state that is safe, then at 908, the current mode is stopped and exited.

Next, at 910, the robot device is placed into a safe starting state for the new mode. As before, some systems may include a single universal starting location/state that is applicable for all modes. In the alternative, some or all of the modes may be configured to have individualized safe start locations/states. In some embodiments, safe start (and possibly stop) locations/states correspond to locations with a large amount of free space/volume around them, such that they can move to/from other start/stop locations without collisions en route. Safe start/stop locations/states may be distinct within a specific mode, as one may want to start an operation (e.g., camera calibration pass) with the robot/camera starting at a location (e.g., one side of a target) and stopping at another location (e.g., at the other side of the target). They may also differ between modes. For example, in Mode A, the operation may be placing an object in bin A, and so Mode A may have a stop space positioned above bin A, and then Mode B may involve picking an object from bin B, so its start space may be above bin B. Once the robot has been placed into a state that is safe to start the mode, then at 912, the new mode is started.

Once the new mode is started, the system waits to receive a trigger (e.g., from a client) at 914. The controller may also optionally receive trigger data for use in a predefined mode function corresponding to the trigger received at 914. At 916, the robot will perform the predefined mode function corresponding to the trigger and, optionally, the trigger data. Examples of predefined mode functions include: (1) moving a portion of the robot through points A, B, C, etc. and (2) moving a portion of the robot to point D, which is defined in the optional trigger data.

At 918, the system waits for the next input (e.g., from a client). If the next input is a mode change, the process returns to 900. If the next input is a trigger/trigger command, the process returns to 914. If the next input is an end signal, the process ends at 920.

ILLUSTRATIVE EMBODIMENT

The present invention may be applied to implement robotics in any desired operating environment or purpose. By way of illustration, an embodiment will now be described in which the inventive robot architecture is employed to perform device calibration, data collection, and device testing for machine vision devices (e.g., cameras).

A camera is a device that is often employed to capture images or video. The data captured by the camera is used in a variety of different purposes and contexts. For example, a wearable device may include one or more onboard cameras to provide image data for the surrounding environment around the user of that wearable device. One example is the stereoscopic wearable glasses that features two forward-oriented cameras configured to capture images for an augmented reality presentation to the user through stereoscopic displays. The wearable glasses may also include backwards-oriented cameras to capture images of the user's eyes.

Camera calibration is often performed to ensure the precision and accuracy of camera, as well as the information extracted from the image data captured by the camera. The camera calibration process determines the true parameters of a camera device that produces an image, which allows for determination of calibration data of the camera such as intrinsic parameters and extrinsic parameters. The intrinsic parameters include, but are not limited to, focal point, focal length, principal point, and distortion coefficients. The extrinsic parameters include, but are not limited to, positional relationships between multiple cameras, and translational and rotational offsets between sensors.

Figure 10:
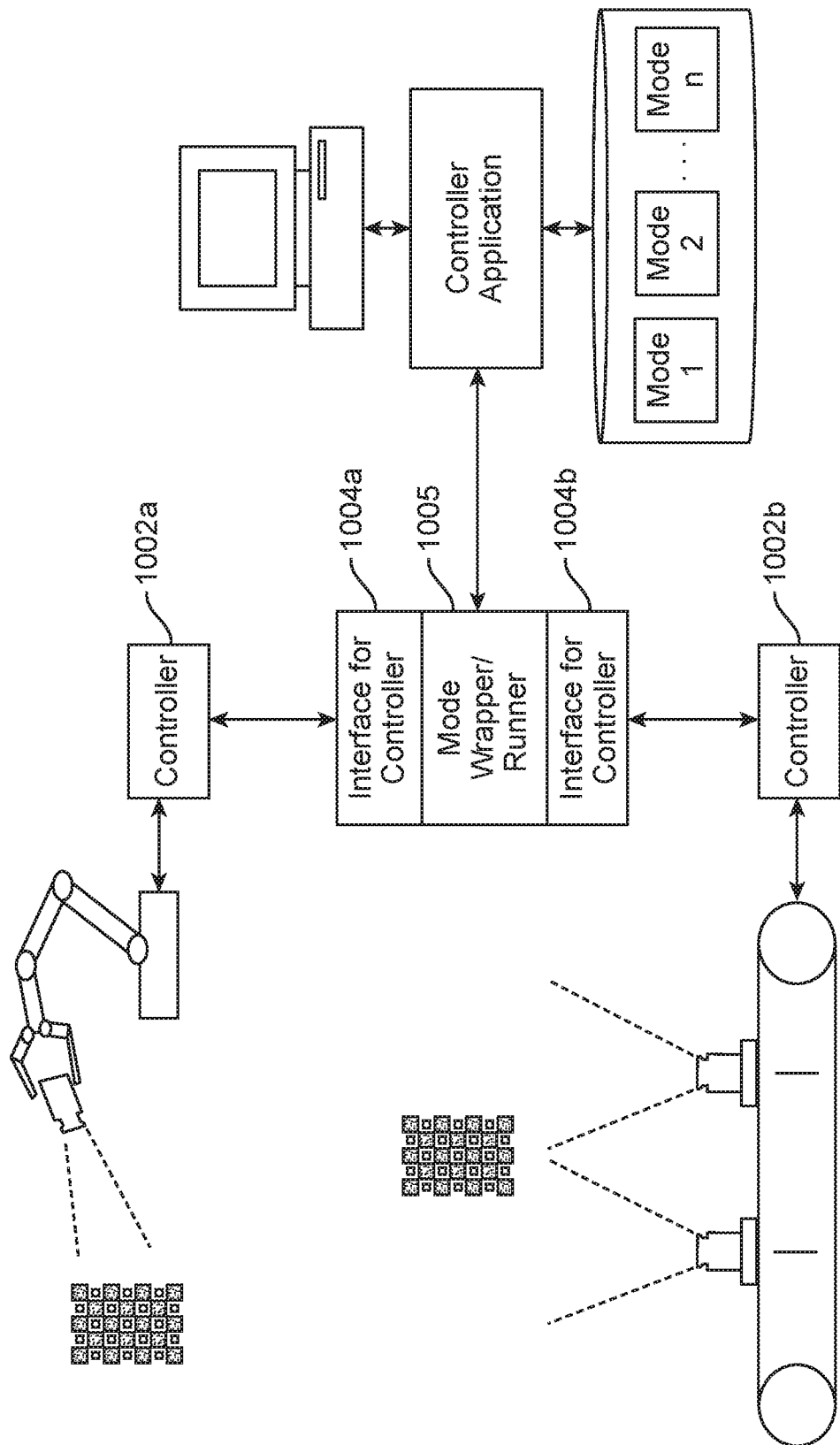
FIG. 10 illustrates possible robot systems that can be used to perform camera calibration according to some embodiments.
Figure 11:
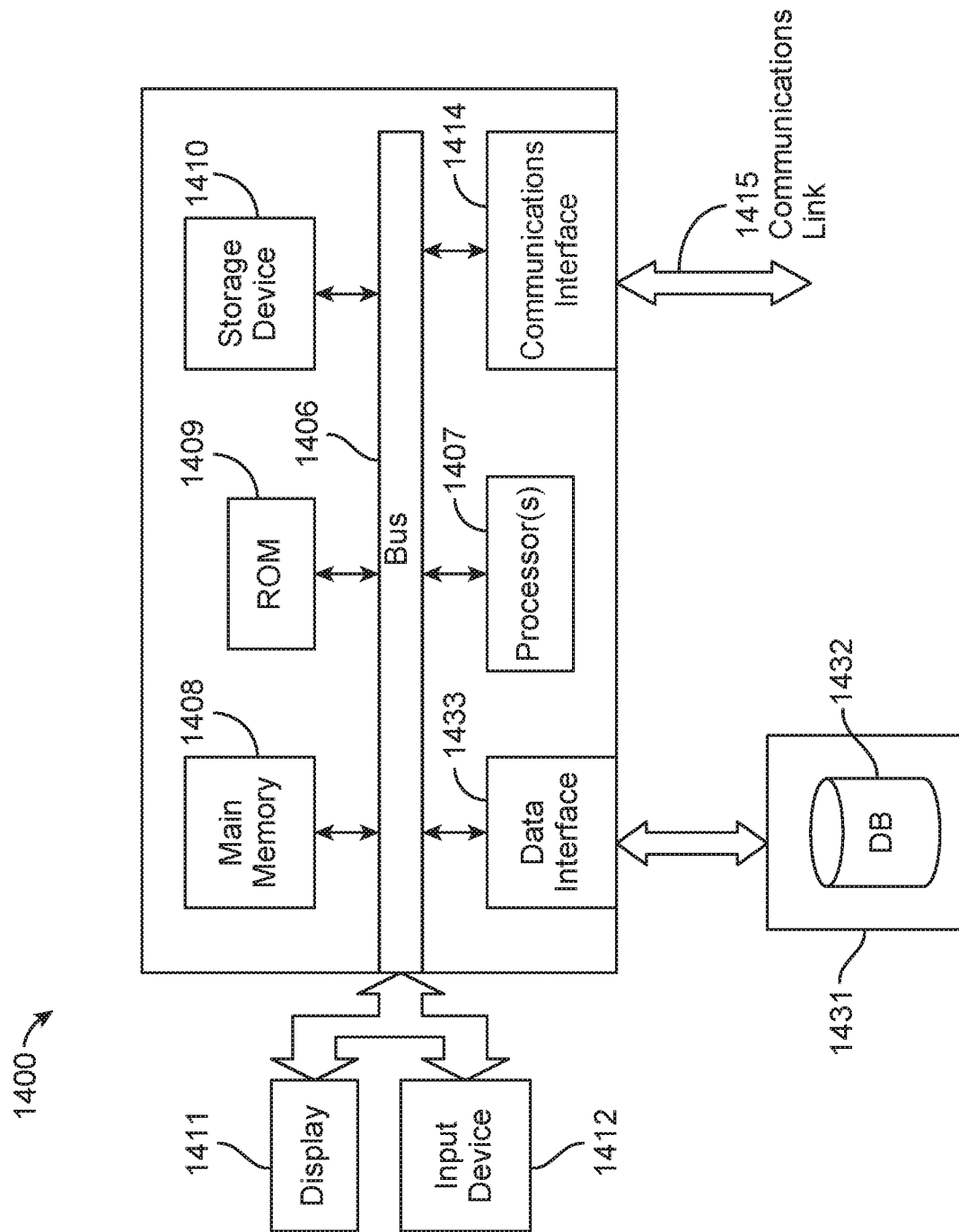
FIG. 11 depicts a computerized system on which some embodiments can be implemented.

To perform camera calibration, the camera can be mounted onto a mechanical device, and moved into multiple positions to capture images of a calibration target. FIG. 10 illustrates two possible robot systems that can be used to perform camera calibration, where a first system uses a robot arm to position the camera into the different positions and the second approach uses a conveyor belt to move the camera(s). This situation may arise, for example, where the robot arm system is initially employed to develop the general flow and parameters of the calibration process, while a later transition occurs to subsequently use the conveyor belt system in a production setting.

The issue is that conventional robot implementations would require two entirely separate sets of control software to be developed for each of the different robot platforms. This means that despite the significant investment made to develop the control software for the first robot platform, it may not be possible to directly re-use and efficiently leverage that software for the second platform.

Moreover, to the extent that the robot platforms are implemented by a third party manufacturer, this means that proprietary information pertaining to the control software may need to be provided to the third party to implement the robot system. Even if the robot system is not under the control of a third party, the OS within the robot systems may not be fitted with robust and/or adequate security systems, thus presenting a possible security threat to proprietary information located within the control software.

The embodiments of the present invention address these problems by implementing a mode execution module 1005 to execute the different modes that are executed on each of the robot systems. The control application interacts with the mode execution module 1005 to select the appropriate mode for execution. Specific interfaces are developed to provide the correct commands that can be understood by the individual robot systems. Here, interface 1004a provides the appropriate commands to controller 1002a control the operation of the robot arm system, while interface 1004b provides the appropriate commands to controller 1002b control the operation of the conveyor belt system.

Modes can be developed where some of the modes are usable across multiple robot platforms, while other modes are only usable with specific robot systems. For example, for the conveyor belt system, a multi-camera approach can be employed for performing calibration, where the conveyor belt includes multiple placement positions for multiple cameras, and there are multiple cameras that undergo calibration at any given moment in time. Each of the cameras are located at a designated position, spaced apart from one another at a specified distance, with their image capture direction facing the target. One or more modes can be developed specific to the conveyor belt system to shift the conveyor belt to designated positions for the cameras to take an image from those positions. The mode(s) implement a move-pause-image capture-move again cycle that is repeated until each camera has taken an image from each designated position. Further details regarding an approach to implement camera calibration are described in U.S. Provisional Patent Application No. 62/355,805, filed on Jun. 28, 2016 and U.S. Utility patent application Ser. No. 15/635,120, filed on Jun. 27, 2017, which are hereby incorporated by reference in their entirety.

Another possible mode is an "expedited teach" mode—where a technician teaches a robot the endpoints to a grid, and the robot can then re-generate points within the grid on its own (at a resolution specified by the technician/user) (e.g. "this many angles and this many translation points"). Occasionally there may be unusable points that point a calibration target just far enough away from the device, these can be corrected by hand. This obviates the need for a technician to teach points by hand (which is time consuming and annoying to the technician) and facilitates generation of dozens or hundreds of robot points without having to teach them all by hand while still allowing manual touch up points as needed. This enables rapid generation of very complicated robot movement patterns and fine manual adjustments using calibration expert input.

Of course it is understood that these are merely example of possible modes, and that the invention can be implemented using any number or type of mode that is suitable for a given robot system for implementation purpose.

Therefore, what has been described is an improved method, system, and apparatus to implement execution modes on robotic systems. In the architecture, a mode execution module is provided to execute execution modes on the robotic system. This makes the modes as opaque to the outside world as possible and in so doing makes them interchangeable, permitting users to develop code in a generic manner using normalized function calls, regardless of the specific robot system on which that mode may eventually be executed upon. In addition, this approach provides limited safe access to the robot to any users within the organization. Moreover, the present approach provides an architecture that allows for flexible robot routine development while limiting the communication protocol to a small set of commands. Further, the present approach minimizes exposure of sensitive or proprietary information to third parties, such as robotic system vendors.

SYSTEM ARCHITECTURE OVERVIEW

FIG. 10 is a block diagram of an illustrative computing system 1400 suitable for implementing an embodiment. Computer system 1400 includes a bus 1406 or other communication mechanism for communicating information, which interconnects subsystems and devices, such as processor 1407, system memory 1408 (e.g., RAM), static storage device 1409 (e.g., ROM), disk drive 1410 (e.g., magnetic or optical), communication interface 1414 (e.g., modem or Ethernet card), display 1411 (e.g., CRT or LCD), input device 1412 (e.g., keyboard), and cursor control.

According to one embodiment, computer system 1400 performs specific operations by processor 1407 executing one or more sequences of one or more instructions contained in system memory 1408. Such instructions may be read into system memory 1408 from another computer readable/ usable medium, such as static storage device 1409 or disk drive 1410. In alternative embodiments, hard-wired circuitry may be used in place of or in combination with software instructions to implement the system and/or method. Thus, embodiments are not limited to any specific combination of hardware circuitry and/or software. In one embodiment, the term "logic" shall mean any combination of software or hardware that is used to implement all or part of the system and/or method.

The term "computer readable medium" or "computer usable medium" as used herein refers to any medium that participates in providing instructions to processor 1407 for execution. Such a medium may take many forms, including but not limited to, non-volatile media and volatile media. Non-volatile media includes, for example, optical or magnetic disks, such as disk drive 1410. Volatile media includes dynamic memory, such as system memory 1408.

Common forms of computer readable media include, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, or any other medium from which a computer can read.

In one embodiment, execution of the sequences of instructions to practice the method is performed by a single computer system 1400. According to other embodiments, two or more computer systems 1400 coupled by communication link 1415 (e.g., LAN, PTSN, or wireless network) may perform the sequence of instructions required to practice the method in coordination with one another.

Computer system 1400 may transmit and receive messages, data, and instructions, including program, e.g., application code, through communication link 1415 and communication interface 1414. Received program code may be executed by processor 1407 as it is received, and/or stored in disk drive 1410, or other non-volatile storage for later execution. Computer system 1400 may communicate through a data interface 1433 to a database 1432 on an external storage device 1431.

In the foregoing specification, the invention has been described with reference to specific embodiments thereof. It will, however, be evident that various modifications and changes may be made thereto without departing from the broader spirit and scope of the invention. For example, the above-described process flows are described with reference to a particular ordering of process actions. However, the ordering of many of the described process actions may be changed without affecting the scope or operation of the invention. The specification and drawings are, accordingly, to be regarded in an illustrative rather than restrictive sense.

What is claimed is:

1. A system, comprising:
   an execution module that receives software instructions in a normalized programming language;
   an interface having a translation layer that converts the software instructions from the normalized language into robot-specific instructions that operate in a particular robotic system;
   a controller that is communicatively coupled to the interface, wherein the controller receives the robot-specific instructions; and
   a robotic device that is operatively controlled by the controller by execution of the robot-specific instructions,
   wherein the software instructions include:
      identifying a selection of a selected mode,
      determining whether the selected mode is acceptable in light of a current state of the robotic device,
      placing the robotic device into a safe exit state or location for a current mode responsive to determining that the selected mode is acceptable,
      stopping the current mode,
      placing the robotic device into a safe entry state or location for the selected mode, and
      starting the selected mode.

2. The system of claim 1, wherein the software instructions comprises one or more execution modes corresponding to at least one of an enter mode, an exit mode, and a trigger mode.

3. The system of claim 1, further comprising a second interface that converts the software instructions from the normalized language into second robot-specific instructions that are sent to a second controller to operatively control a second robotic device, wherein the second robotic device corresponds to a different type of device from the robot device, and the second robot-specific instructions for the second robotic device corresponds to a different set of programming instructions from the robot-specific instructions for the robotic device.

4. The system of claim 1, wherein the execution module comprises a mode selection module, a mode instruction processing module, and a controller interface module, the mode selection module selecting a specific mode based on a mode selection instruction, the mode instruction processing module determining a specific combination or sequence of mode instructions to be issued to the controller to perform a desired operation, and the controller interface module issuing one or more API calls corresponding to the particular robotic system that are sent to the controller.

5. The system of claim 1, wherein at least one of safe entry points or safe exit points are established for entry or exit of modes.

6. The system of claim 1, further comprising a rulebase having a set of rules that identifies acceptable or unacceptable sequences of modes for one or more robotic systems, wherein the set of rules are accessed to determine wherein a selected mode of operation for the robotic device is acceptable as a next mode of operation.

7. The system of claim 1, wherein the controller comprises a real-time operating system that controls a motor driver to operate the robotic device, and the execution module is loaded as an application onto the controller.

8. The system of claim 1, wherein the controller comprises both a real-time operating system (RTOS) and a user-space operating system (OS), the RTOS controlling a motor driver to operate the robotic device, the user-space OS providing user-specified commands to the RTOS, and the interface issuing API calls that are understandable by a manufacturer-provided robot application layer within the user-space OS to execute the software instructions.

9. The system of claim 1, wherein the controller comprises a thin interface layer and mode control functionality is located within a mode control/select layer that is located at a control application at a control computer, the interface having functionality to communicate with the mode control/select layer and to deliver the robot-specific instructions to a RTOS.

10. The system of claim 1, wherein the execution module is implemented as a loadable kernel module (LKM) within a RTOS at the controller.

11. A method, comprising:
receiving software instructions for a robotic device in a normalized programming language;
converting the software instructions from the normalized language into robot-specific instructions that operate in a particular robotic system corresponding to the robotic device;
controlling the robotic device by execution of the robot-specific instructions;
identifying a selection of a selected mode;
determining whether the selected mode is acceptable in light of a current state of the robotic device;
placing the robotic device into a safe exit state or location for a current mode responsive to determining that the selected mode is acceptable;
stopping the current mode;
placing the robotic device into a safe entry state or location for the selected mode; and
starting the selected mode.

12. The method of claim 11, wherein the software instructions comprises one or more execution modes corresponding to at least one of an enter mode, an exit mode, and a trigger mode.

13. The method of claim 11, wherein a set of rules in a rulebase are accessed to determine wherein the selected mode for the robotic device is acceptable as a next mode of operation.

14. The method of claim 13, wherein if the selected mode is not acceptable, then a determination is made of an alternative instruction that is an acceptable alternative to the selected mode.

15. The method of claim 14, wherein the alternative instruction is determined by at least one of checking the rulebase, performing manual intervention, or using a machine learning system.

16. The method of claim 11, wherein within a single mode, the safe exit state or location is different from the safe entry state or location.

17. The method of claim 11, wherein between different modes, the safe exit state or location or safe entry state or location for a first mode is different from the safe exit state or location or safe entry state or location for a second mode.

18. The method of claim 11, wherein once a new mode is entered, a waiting period is entered for a trigger.

19. The method of claim 18, wherein the robotic device performs a predefined mode function corresponding to the trigger.

20. The method of claim 11, wherein the software instructions are converted from the normalized language into robot-specific instructions by generating a set of API calls that correspond to the particular robotic system corresponding to the robotic device.

21. A computer program product embodied on a non-transitory computer readable medium, the non-transitory computer readable medium having stored thereon a sequence of instructions which, when executed by a processor causes the processor to execute a method comprising:
receiving software instructions for a robotic device in a normalized programming language;
converting the software instructions from the normalized language into robot-specific instructions that operate in a particular robotic system corresponding to the robotic device;
controlling the robotic device by execution of the robot-specific instructions;
identifying a selection of a selected mode;
determining whether the selected mode is acceptable in light of a current state of the robotic device;
placing the robotic device into a safe exit state or location for a current mode responsive to determining that the selected mode is acceptable;
stopping the current mode;
placing the robotic device into a safe entry state or location for the selected mode; and starting the selected mode.

22. The computer program product of claim 21, wherein the software instructions comprises one or more execution modes corresponding to at least one of an enter mode, an exit mode, and a trigger mode.

23. The computer program product of claim 21, wherein a set of rules in a rulebase are accessed to determine wherein the selected mode for the robotic device is acceptable as a next mode of operation.

24. The computer program product of claim 23, wherein if the selected mode is not acceptable, then a determination is made of an alternative instruction that is an acceptable alternative to the selected mode.

25. The computer program product of claim 24, wherein the alternative instruction is determined by at least one of checking the rulebase, performing manual intervention, or using a machine learning system.

26. The computer program product of claim 21, wherein within a single mode, the safe exit state or location is different from the safe entry state or location.

27. The computer program product of claim 21, wherein between different modes, the safe exit state or location or safe entry state or location for a first mode is different from the safe exit state or location or safe entry state or location for a second mode.

28. The computer program product of claim 21, wherein once a new mode is entered, a waiting period is entered for a trigger.

29. The computer program product of claim 28, wherein the robotic device performs a predefined mode function corresponding to the trigger.

30. The computer program product of claim 21, wherein the software instructions are converted from the normalized language into robot-specific instructions by generating a set of API calls that correspond to the particular robotic system corresponding to the robotic device.

* * * * *